United States Patent
Takahashi et al.

(10) Patent No.: US 6,463,188 B1
(45) Date of Patent: Oct. 8, 2002

(54) OPTICAL INTEGRATED CIRCUIT DEVICE

(75) Inventors: Hiromi Takahashi; Hideki Ono, both of Tokyo (JP)

(73) Assignee: Oki Electric Industrial Co., Ltd., Tokyo (JP)

( * ) Notice: Subject to any disclaimer, the term of this patent is extended or adjusted under 35 U.S.C. 154(b) by 0 days.

(21) Appl. No.: 09/531,777

(22) Filed: Mar. 21, 2000

(30) Foreign Application Priority Data

Sep. 24, 1999 (JP) .......................... 11-270454

(51) Int. Cl.⁷ .................................... G02B 6/12
(52) U.S. Cl. .................. 385/14; 385/42; 385/43; 385/45; 385/132
(58) Field of Search .................. 385/14, 15, 31, 385/39, 42, 43, 45, 129, 132

(56) References Cited

U.S. PATENT DOCUMENTS

| | | | | |
|---|---|---|---|---|
| 5,163,106 A | * | 11/1992 | Okayama et al. | 385/45 |
| 5,623,568 A | * | 4/1997 | Khan et al. | 385/45 |
| 5,757,990 A | * | 5/1998 | Miyakawa | 385/16 |
| 5,757,995 A | * | 5/1998 | Chen et al. | 385/45 |
| 5,799,119 A | * | 8/1998 | Rolland et al. | 385/28 |
| 5,818,989 A | * | 10/1998 | Nakamura | 385/45 |
| 5,889,898 A | * | 3/1999 | Koren et al. | 385/9 |
| 6,064,788 A | * | 5/2000 | Knan et al. | 385/45 |
| 6,222,966 B1 | * | 4/2001 | Khan et al. | 385/45 |
| 6,236,784 B1 | * | 5/2001 | Ido | 385/45 |
| 6,243,516 B1 | * | 6/2001 | Seino | 385/47 |

FOREIGN PATENT DOCUMENTS

JP          6-18730          1/1994          ............... 385/14 X

* cited by examiner

*Primary Examiner*—Brian Healy
(74) *Attorney, Agent, or Firm*—Wenderoth, Lind & Ponack, L.L.P.

(57) ABSTRACT

In order to reduce the degree to which transmission loss occurs at the branching portion in a Y-branch structure provided at an optical integrated circuit device, the Y-branch structure through which a light signal input through an input waveguide is branched and transmitted into two output waveguides adopts the following features. The Y-branch structure is provided with a tapered waveguide having an input surface with a waveguide width a equal to the width of the input waveguide which is connected flush to the input waveguide and an output surface having a waveguide width W (>2a+g) is larger than a width 2a+g achieved by adding a width g of the gap between the output waveguides to a width 2a equal to the total of the widths of the two output waveguides each having a waveguide width a equal to the width of the input waveguide, which is connected with the two output waveguides via a stage.

6 Claims, 8 Drawing Sheets

OPTICAL INTEGRATED CIRCUIT DEVICE

BACKGROUND OF THE INVENTION

1. Field of the Invention

The present invention relates to an optical integrated circuit device having a Y-branch structure such as a 1×N splitter (including a Y-branch waveguide circuit) or an optical transmission/reception module circuit.

2. Description of the Related Art

Publication: Japanese Unexamined Patent Publication No. 1994-18730.

The Y-branch structure is one of the essential technologies that are vital in achieving branching of a light signal. To date, a number of publications have disclosed numerous embodiments for realizing a Ybranch structure with a smaller transmission loss. The above is one of such publications. For instance, FIG. 4 of the publication discloses a structure achieved by using a tapered waveguide (with the smaller core width set at W11 and the larger core width set at W12 (=2×W11)) to guide a light signal entering through an input waveguide to an output waveguide, connecting the input waveguide having a core width of W11 to the side of the tapered waveguide with the smaller core width and connecting two branched waveguides each having a core width W13 (=W11) to the side with the larger core width.

SUMMARY OF THE INVENTION

However, a technical problem arises when actually manufacturing the Y-branch structure shown in FIG. 4 of the publication in that the shape of the front end of the wedge that must be formed at the branching portion becomes dull and as a result, has a specific width, to cause an increase in the transmission loss at the branching portion. In order to solve the problem in the Y-branch structure shown in FIG. 4 and reduce the transmission loss at the branching portion, the publication proposes a structure achieved by fitting a wedge structure member at the branching portion thereof, as illustrated in FIG. 1.

Even when the Y-branch structure in FIG. 1 of the publication is adopted, i.e., even when a wedge structure member is fitted at the branching portion, branched waveguides having a width much smaller than the core width are required for the connection to the output waveguide. Thus, even a very slight dimensional error occurring during the production results in a great degree of inconsistency in the characteristics. In addition, the presence of the branched waveguides having a width much smaller than the core width tends to cause a slight defect within the core to manifest as a great degree of inconsistency in the characteristics.

Addressing the problems discussed above, according to the present invention, in an optical integrated circuit device having a Y-branch structure for branching a light signal input through an input waveguide to transmit the branched light signal into two output waveguides, the Y-branch structure satisfies the following requirement.

Namely, the Y-branch structure is provided with a tapered waveguide having an input surface that has a waveguide width "a" equal to the width of the input waveguide to be connected flush to the input waveguide and an output surface with a waveguide width W (>2a+g) which is larger than a width 2a+g achieved by adding a gap width g, which is the dimension of the gap between two output waveguides to a width 2a equivalent to the total width of the two output waveguides each having a waveguide width a equal to the width of the input waveguide to be connected with the two output waveguides via a stage.

It is desirable to the tapered waveguide according to the present invention satisfy theta2<theta1<2×theta2 when tan theta2=g/2L and a+2L tan theta1>2a+g with L representing the length of the tapered waveguide, theta1 representing the opening angle created by an inclining surface of the tapered waveguide relative to the central axis of the tapered waveguide and theta2 representing the mounting angle at which an output waveguide is mounted at the tapered waveguide relative to the central axis of the tapered waveguide.

Alternatively, the tapered waveguide according to the present invention should satisfy theta2<1.0° when (a+g)/2L<tan theta1<(a+g)/L, with L representing the length of the tapered waveguide, theta1 representing the opening angle created by an inclining surface of the tapered waveguide relative to the central axis of the tapered waveguide and theta2 representing the mounting angle at which an output waveguide is mounted at the tapered waveguide relative to the central axis of the tapered waveguide.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments. In the drawings:

FIGS. 4(*a*-1), (*a*-2), (*a*-3), (*b*-1), (*b*-2), (*b*-3) illustrates the intensity distribution of the electric field manifesting at two points on the Y-branch structure 100;

DETAILED DESCRIPTION OF THE PREFERRED EMBODIMENTS (A) First Embodiment

The following is an explanation of the first embodiment of the Y-branch structure which is commonly adopted in the optical integrated circuit device proposed in this specification.

(A-1) Features of the Y-branch Structure

Figure 1A:
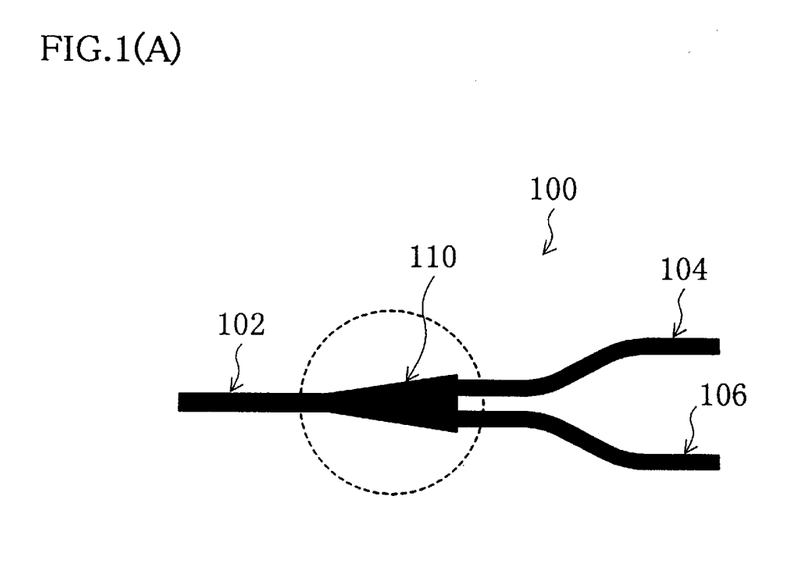
FIGS. 1(A) and (B) illustrates the Y-branch structure 100 according to the present invention.
Figure 1B:
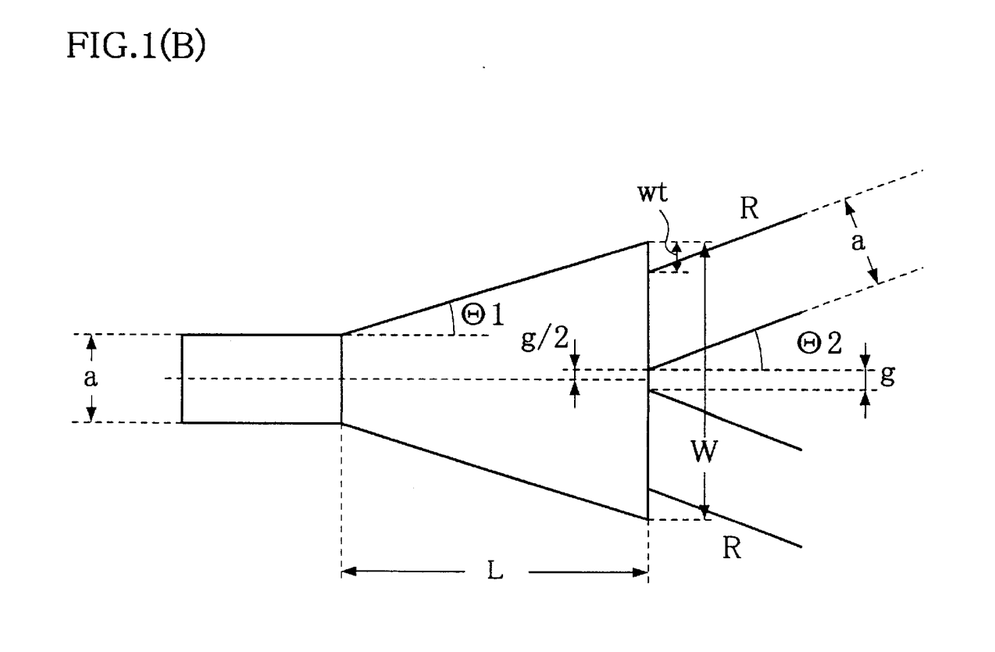

FIG. 1 illustrates a Y-branch structure 100 achieved in this embodiment. FIG. 1(A) is an external view of the Y-branch structure and FIG. 1(B) is a partial enlargement thereof.

As shown in FIG. 1, the Y-branch structure 100 in the embodiment comprises an input waveguide 102, output waveguides 104 and 106 and a tapered waveguide 110. A light signal enters through the input waveguide 102. The light signal that has been branched is transmitted into the output waveguides 104 and 106. The tapered waveguide 110 provided between them guides the light signal input from the input waveguide 102 to the output waveguides 104 and 106.

The tapered waveguide 110 is a trapezoidal waveguide with its waveguide width expanding at a specific rate along the direction in which the light signal advances (the direction extending from the input waveguide 102 toward the output waveguides 104 and 106). In addition, its input surface (having a smaller waveguide width) is connected flush with the input waveguide 102.

An output surface (having a larger waveguide width) of the tapered waveguide 110 has a waveguide width W (>2a+g) which is larger than the width 2a+g achieved by adding a width g of the gap between the output waveguides at the connecting end to a width 2a equal to the total of the widths of the two output waveguides each having a waveguide width a equal to the width of the input waveguide 102. In addition, a stage is created where the tapered waveguide connects with the output waveguides 104 and 106.

The following is an explanation of how the technical problems discussed earlier can be solved by adopting the Y-branch structure 100 described above and the specific requirement that must be satisfied to achieve more desirable transmission characteristics.

It is to be noted that in the following explanation, L represents the length of the tapered waveguide 110 in FIG. 1, g represents the width of the gap between the output waveguides at the connecting area, theta1 represents the opening angle of the tapered waveguide 110 relative to its central axis (the core center), theta2 represents the mounting angle at which the output waveguides (with a curvature R) 104 and 106 are mounted at the tapered waveguide 110 relative to the central axis of the tapered waveguide 110, wt represents the stage created along the widthwise direction at the connecting area between the tapered waveguide 110 and the output waveguides 104 and 106 and W represents the width of the tapered waveguide 110 at its output surface.

The following requirement were satisfied in the Y-branch structure used in the test. Firstly, the opening angle theta1 of the tapered waveguide 110 was set so as to achieve a relationship expressed as g/2L=theta2 between the length L of the tapered waveguide 110 and the gap width g. Secondly, the opening angle theta1 of the tapered waveguide 110 was set to be equal to or greater than the angle theta2 formed by its central axis and the output waveguide 104 or 106. Thirdly, the core diameters of the input waveguide 102 and the output waveguides 104 and 106 were both set to 5 microns×5 microns, with the refraction factor difference Δn at 0.35% and the curvature R of the output waveguides 104 and 106 at 25 mm.

Figure 2:
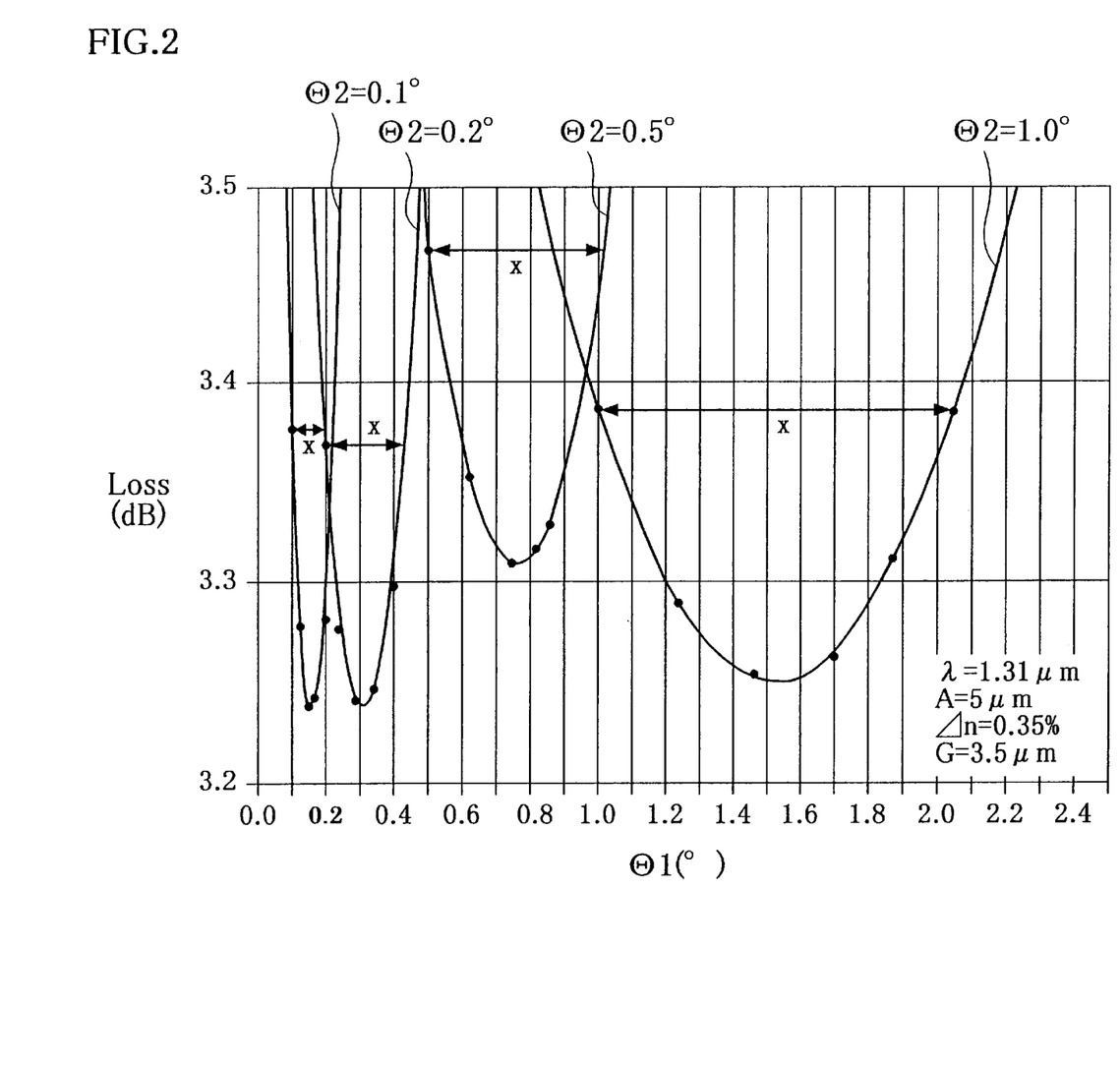
FIG. 2 shows the transmission loss characteristics that are dependent upon the opening angle theta1 of the tapered waveguide 110.

FIG. 2 shows changes in transmission loss occurring when the value representing theta1 alone is varied in the range of 0.1~1.0 with the value of theta2 fixed. As FIG. 2 indicates, a lower transmission loss relative to the transmission loss occurring when theta1=theta2 is achieved in the range over which theta1 is larger than theta2 (specifically, the range indicated by the arrows superimposed on each characteristics curve (the downward parabolic arc) corresponding to a given value set for theta2).

In addition, it is clear that the value of theta1 that achieves the smallest transmission loss is 1.5 times theta2 (theta 1=1.5×theta2), regardless of the value set for theta2. Specific dimensions of the tapered waveguide 110 that satisfy the requirement theta1=1.5×theta2 include the length L of the tapered waveguide 110 at 487 microns, theta1 at 0.75° and the stage wt between the tapered waveguide 110 and the output waveguides 104 and 106 at the output side connecting end at 2.1 microns if the waveguide width (core width) a is set to 5 microns, the gap width g set to 3.5 microns and theta2 is set to 0.5°. It is to be noted that in this structure, the, width W at the output side connecting end is 17.7 microns.

Figure 3:
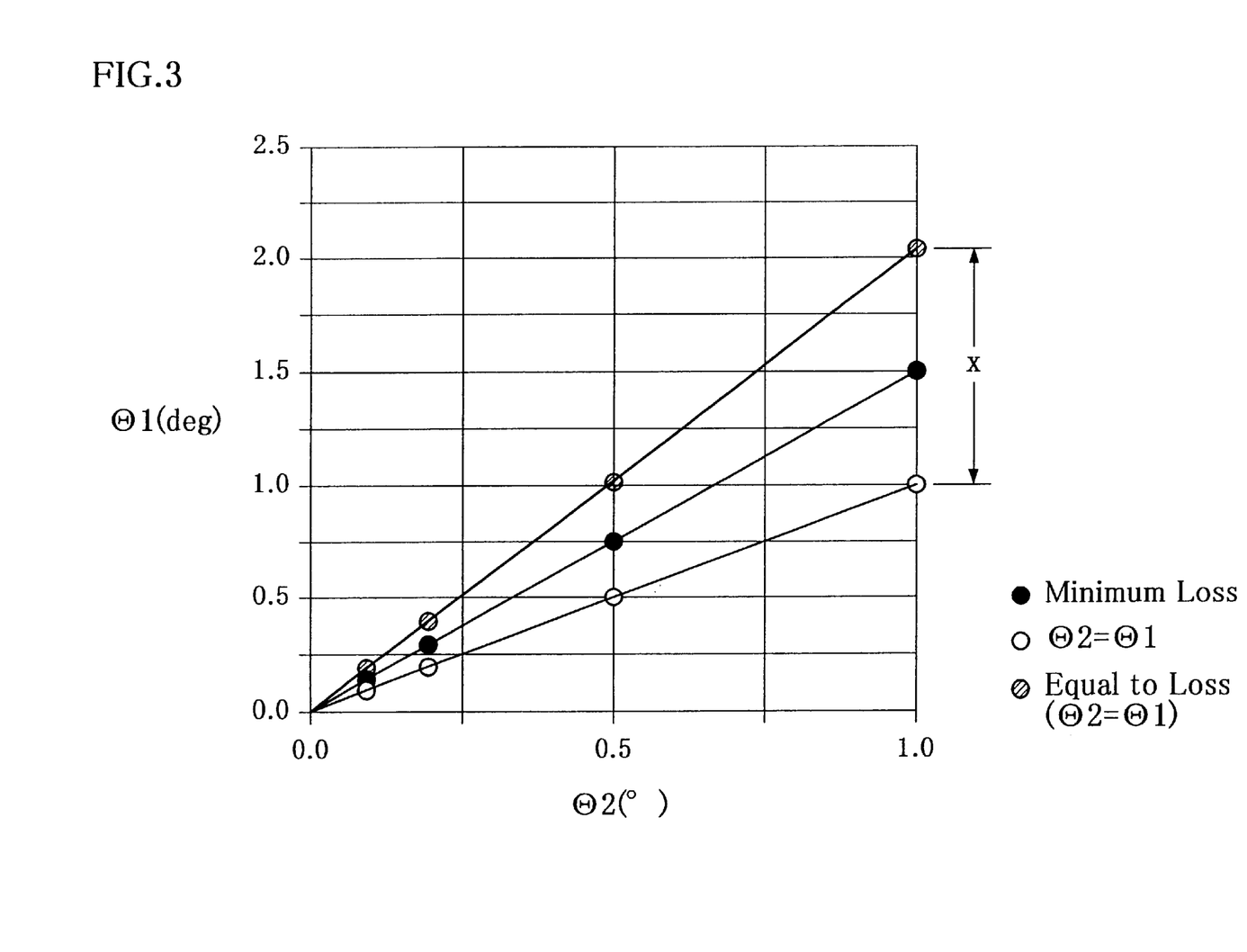
FIG. 3 shows the correlation between the opening angle theta1 of the tapered waveguide 110 and the mounting angle theta2 of an output waveguide.

The conclusions drawn above are illustrated in FIG. 3, with the vertical axis representing theta1 and the horizontal axis representing theta2. The figure demonstrates with even greater clarity that in the range X (the range indicated by the arrows in FIG. 2) of theta1, in which theta2<theta1<2× theta2, over which the transmission loss is lower than that occurring when theta1=theta2.

In other words, the structural requirement that the Y-branch structure 100 must satisfy in this embodiment are;

theta2<theta1<2×theta2 when tan theta2=g/2L and a+2L tan theta1>2a+g.

(A-2) Branching Operation

Figure 4:
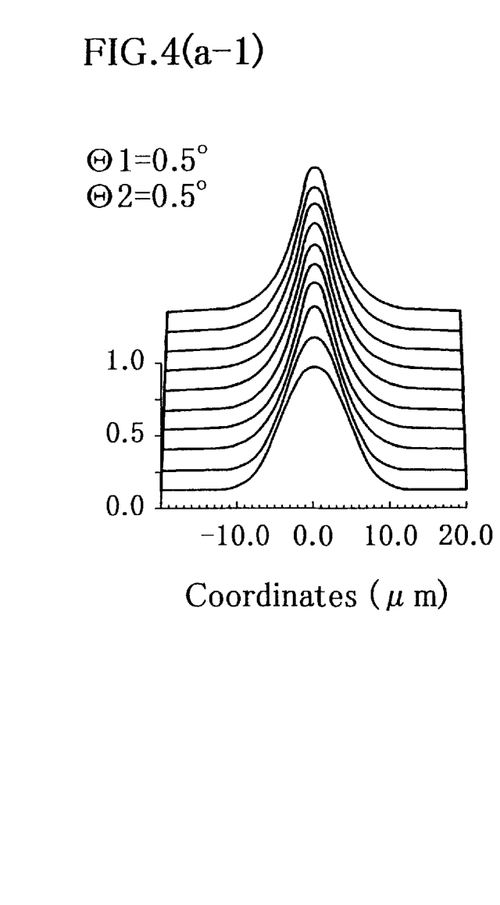

Next, the specific manner in which the light signal is actuallY-branched in the Y-branch structure 100 meeting the requirement discussed above is explained from the viewpoint of the electric field intensity distribution characteristics. FIG. 4 presents the electric field intensity distribution characteristics measured with the Y-branch structure 100.

It is to be noted that the graphs in the upper section of FIG. 4 represent distribution characteristics at the connecting area where the tapered waveguide 110 and the output waveguide 104 or 106 connect with each other, i.e., at the output side connecting end, whereas those in the lower section of FIG. 4 represent distribution characteristics manifesting at a point further toward the output waveguide by approximately 300 microns along the central axis of the tapered waveguide 110 relative to the connecting area where the tapered waveguide 110 and the output waveguide 104 or 106 connect with each other (i.e., the output side connecting end). The central coordinates (0, 0) along the horizontal axis in FIG. 4 indicate a point on the central axis of the tapered waveguide 110, with the vertical axis representing the electric field intensity.

In addition, in FIG. 4, (a-1) and (b-1) are distribution characteristics diagrams corresponding to requirements whereby theta1=0.5° and theta2=0.5°, (a-2) and (b-2) are distribution characteristics diagrams corresponding to requirements whereby theta1=0.735° and theta2=0.5° and (a-3) and (b-3) are distribution characteristics diagrams corresponding to requirements whereby theta1=0.97° and theta2=0.5°.

In other words, (a-1) and (b-1) correspond to a state near the lower limit of the angular requirement that must be satisfied in the Y-branch structure 100 in the embodiment, (a-2) and (b-2) correspond to a state achieving the angular requirement that allows the Y-branch structure 100 in the embodiment to achieve the most desirable characteristics and (a-3) and (b-3) correspond to a state near the upper limit of the angular requirement that must be satisfied in the Y-branch structure 100 in the embodiment.

As the graphs (a-1, a-2, a-3) in the upper section of FIG. 4 indicate, the range over which a high electric field intensity is achieved expands as theta1 increases. Consequently, the quantities of the light signal to be guided to the entrances (connecting area where the output waveguides connect with the tapered waveguide 110) of the output waveguides 104 and 106 provided over the gap g from each other can be effectively increased by increasing theta1.

At the same time, as the graphs (b-1, b-2, b-3) in the lower section of FIG. 4 indicate, an electric field intensity distribution is observed in areas where the output waveguides 104 and 106 are not present (e.g., the area indicated by the arrow A in b-3) as theta1 increases. This leads to a conclusion that the quantities of light signal leaking out of the output waveguides 104 and 106 can be effectively reduced by lowering the value of theta1

Thus, when theta1 is set at a value 1.5 times theta2, i.e., 0.735°, the best balance is achieved between the distribution of the electric field intensity manifesting at the output side connecting end of the tapered waveguide 110 and the distribution of the electric field intensity manifesting at the output with guiding channels 104 and 106 with the transmission loss occurring at the branching portion reduced to the lowest level.

(A-3) Advantages of the First Embodiment

As described above, in the Y-branch structure 110 in the embodiment having the tapered waveguide 110 provided between the input waveguide 102 and the output waveguides 104 and 106, by setting the opening angle theta1 of the tapered waveguide 110 within the range of theta2<theta1<2×theta2 with the waveguide width a, the opening angle theta1, the length L of the tapered waveguide 110, the gap width g at the connecting end where the output waveguides 104 and 106 are connected and the mounting angle theta2 at which the output waveguides 104 and 106 are mounted satisfing the requirement tan theta2=g/2L and a+2L tan theta1>2a+g, the extent to which loss occurs due to the gap between the output waveguides 104 and 106 can be reduced.

Figure 5:
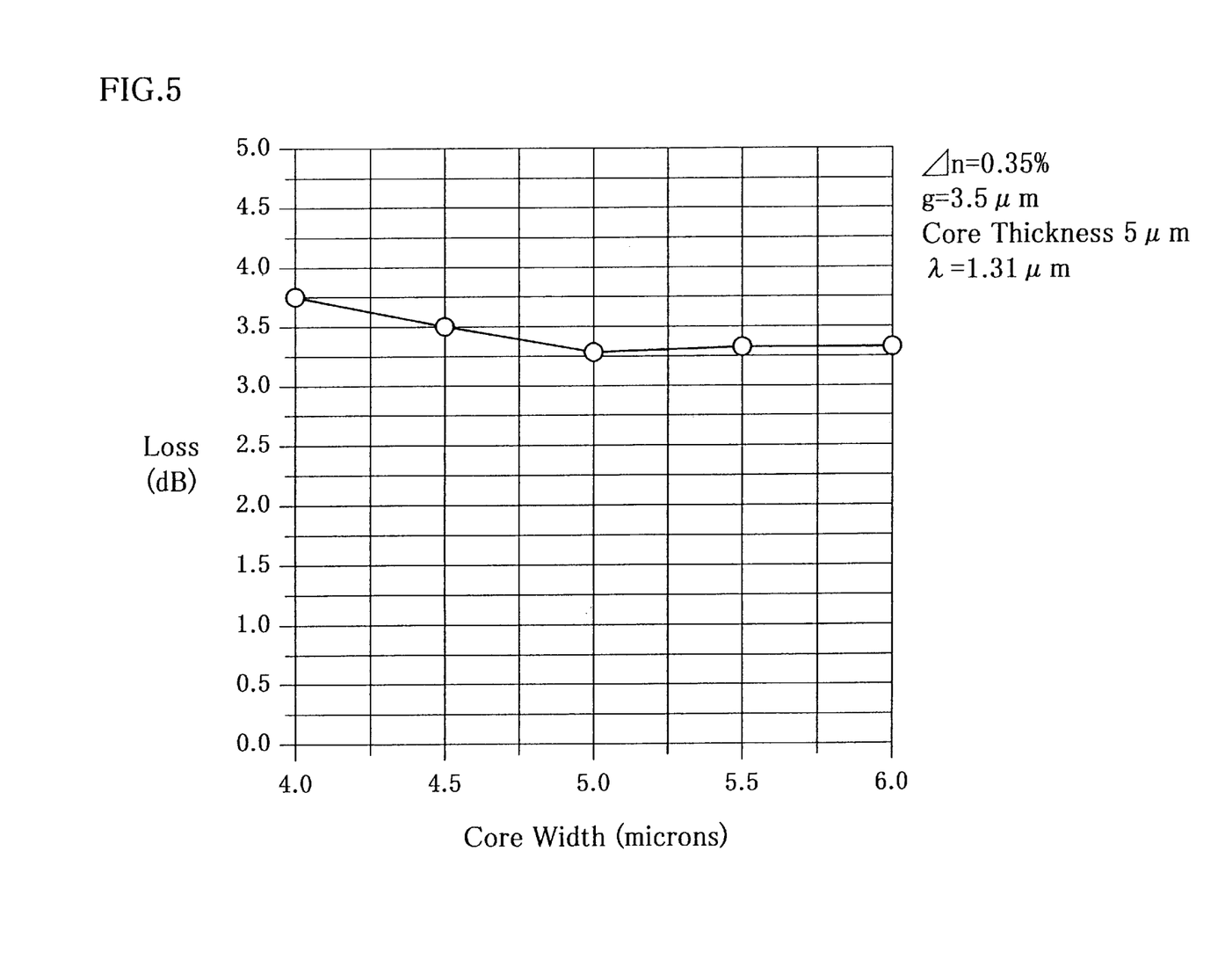
FIG. 5 illustrates the relationship between the transmission channel width (core width) and the loss characteristics.

In addition, since the waveguide widths of the input waveguide 102 and the output waveguides 104 and 106 are set equal to each other, the extent to which the loss fluctuates due to a change in the width can be also reduced as illustrated in FIG. 5.

(B) Second Embodiment

The following is an explanation of the structural features of the Y-branch structure unique to the light waveguide circuit in this embodiment.

(B-1) Features of the Y-branch Structure

The basic features of the Y-branch structure in this embodiment are identical to those illustrated in FIG. 1. Namely, a tapered waveguide is used to constitute the tapered waveguide 110 and its input side connecting end (with the smaller waveguide width) is connected flush to the input waveguide 102. In addition, its output side connecting end (with the larger waveguide width) having a waveguide width W (>2a+g) larger than the width 2a+g achieved by adding the width g of the gap between the output waveguides at the connecting end to the width 2a equal to the total of the widths of the two output waveguides each having a waveguide width a equal to the width of the input waveguide 102 is connected to the output waveguides 104 and 106 via a stage.

This embodiment differs from the first embodiment in the requirement imposed to determine the shape of the tapered waveguide 110. In the first embodiment, the requirement to be satisfied with regard to the relationship between the opening angle theta1 of the tapered waveguide 110 and the mounting angle theta2 at which the output waveguides 104 and 106 are mounted are ascertained. However, in this embodiment, requirement that must be satisfied with respect to the stage wt formed by the output waveguides 104 and 106 at the output side connecting end of the tapered waveguide 110 are ascertained.

In the tapered waveguide 110 illustrated in FIG. 1, the relationship expressed as; (W–a)/2L=tan theta 1 is achieved among its length L, the opening angle theta1 and its width W at the output side connecting end. When the core diameters of the input waveguide 102 and the output waveguides 104 and 106 are all set at 5 microns×5 microns, the refraction factor different Δn=0.35% and the curvature R of the output waveguides 104 and 105 is 25 mm, the relationship illustrated in FIG. 6 is achieved between the stage wt and the transmission loss.

Figure 6:
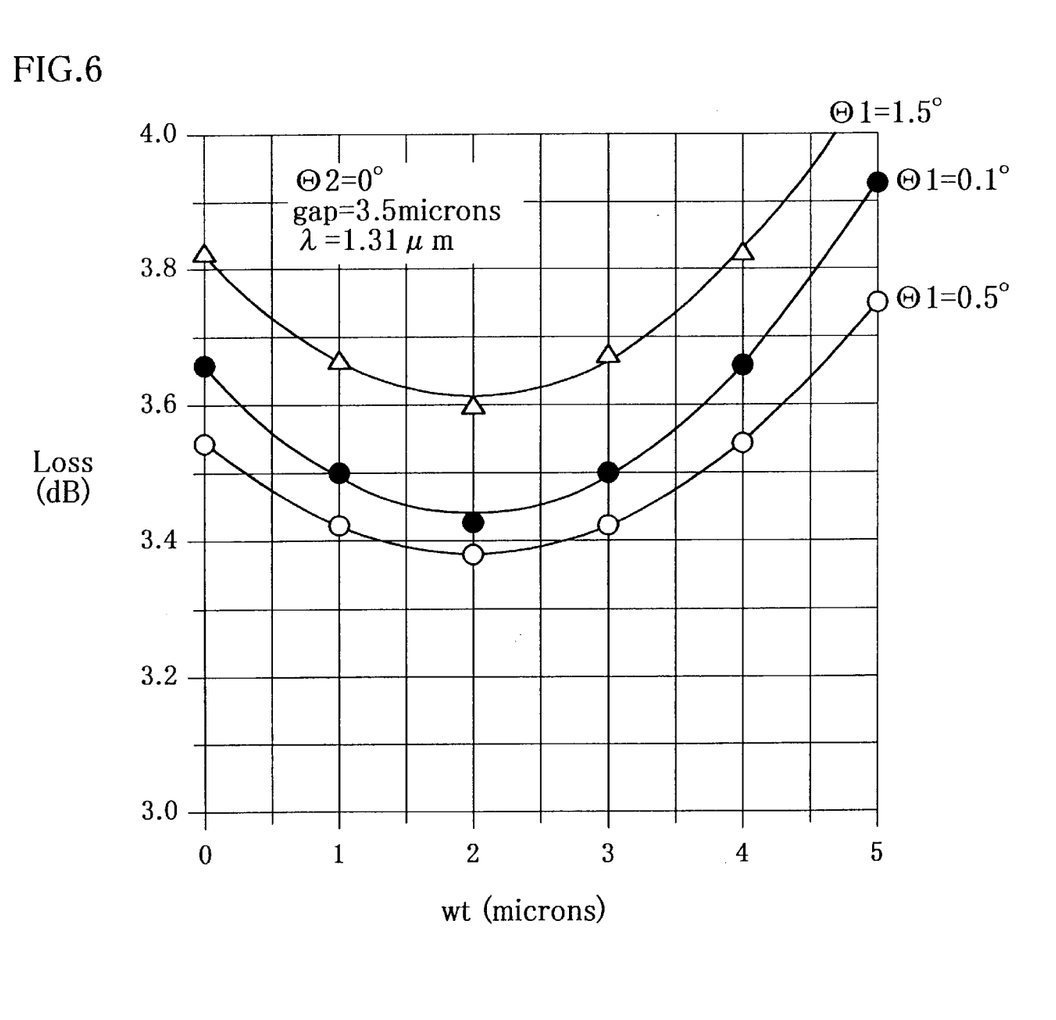
FIG. 6 illustrates the relationship between the stage wt formed along the widthwise direction between the tapered waveguide 110 and the output waveguides 104 and 106 and the loss characteristics.

FIG. 6 presents changes caused in the transmission loss by varying the stage wt between the tapered waveguide 110 and the output waveguides 104 and 106 formed along the widthwise direction at the output side connecting end over a range of 0–5 microns, when the opening angle theta1 of the tapered waveguide 110 is set to 0.5°, 1.0° and 1.5°.

As FIG. 6 demonstrates, the transmission loss is smaller in the range over which the stage wt is between 0 and 4 microns (0<wt<4) compared to the loss occurring if there is no stage wt (wt=0), regardless of the value set for theta1.

Accordingly, the tapered waveguide 110 is formed by ensuring that the stage wt at the tapered waveguide 110 is set within the range of 0<wt<4 in the Y-branch structure in the embodiment. However, since this results in poor operability, the requirement expressed as 0<wt<4 is translated to another, equivalent requirement as follows.

$0 < wt < 4$ $\rightarrow 0 < (W-2a-g)/2 < 4 \ (wt=(W-2a-g)/2 \text{ thus})$ $\rightarrow 0 < W-a-a-g < 8$ $\rightarrow 0 < 2L \tan \text{theta1} - (a+g) < 8 \ (W-a = 2L \tan \text{theta1 thus})$ $a + g < 2L \tan \text{theta1} < a + g + 8 \approx 2(a+g)$ $(a+g)/2L < \tan \text{theta1} < (a+g)/L$ Satisfiing this requirement alone does not realize a Y-branch structure achieving a small transmission loss at all times. This point is now explained in reference to FIG. 7. It is to be noted that FIG. 7 presents the results of a test conducted to ascertain changes occurring in the transmission loss in correspondence to a plurality of values set for theta2 by varying the gap width g in the range of 0~5 microns with theta1 fixed at 0.5° and the stage wt fixed at 2 microns.

Figure 7:
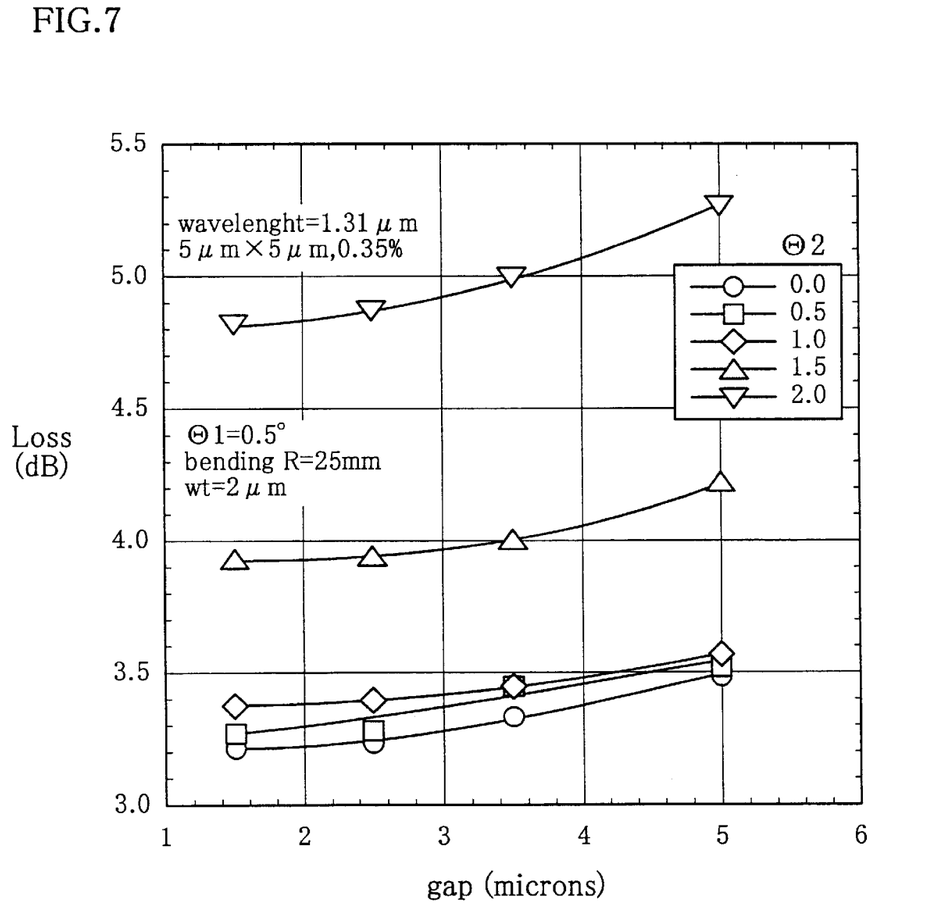
FIG. 7 illustrates the relationship between the gap between the output waveguides 104 and 106 and the loss characteristics.

The results shown in FIG. 7 indicate that the transmission loss is lower than 3.55 dB regardless of the value set for the gap width g if the mounting angle theta2 at which the output waveguides 104 and 106 are mounted at the tapered waveguide 110 is smaller than 1.0° (theta2<1.0°). This requirement is also applicable when the stage wt is set to another value.

Thus, in the Y-branch structure in the embodiment, the requirement expressed as 0<wt<4 (or (a+g)/2L<tan theta1< (a+g)/L) and theta2<1.0° are satisfied.

(B-2) Branching Operation

Next, the physical significance of a smaller transmission loss achieved by employing the Y-branch structure described above is explained. Generally speaking, the light signal needs to enter the output waveguides 104 and 106 parallel to the direction of their axes (the equiphase plane must extend vertical to the output waveguides 104 and 106) to reduce the transmission loss occurring at the output waveguides 104 and 106. However, in the Y-branch structure 100 in the embodiment having an extremely small opening angle theta1 of approximately 0.5~1.5° at the tapered waveguide 110, the light signal entering from the input waveguide 102 is assumed to be transmitted with the tapered waveguide 110 with the equiphase plane extending almost vertical to the direction of incidence of the light signal.

Thus, by setting the mounting angle theta2 at which the output waveguides 104 and 106 are mounted at the tapered waveguide 110 at equal to or less than 1.0° as described above and further setting it as close as possible to 0° at which parallelism with the direction of incidence of the light signal is achieved, the overlapping integral of the electric field intensity distributions at the tapered waveguide 110 and the output waveguides 104 and 106 can be reduced, thereby achieving a reduction in the transmission loss.

(B-3) Advantages of the Second Embodiment

As described above, in the Y-branch structure 100 in the embodiment having the tapered waveguide 110 provided between the input waveguide 102 and the output waveguides 104 and 106, by setting the mounting angle theta2 within the range of theta2<1.0° with the waveguide width a, the opening angle theta1 of the tapered waveguide 110, the length L of the tapered waveguide 110, the gap width g at the connecting end where the output waveguides 104 and 106 are connected and the mounting angle theta2 of the output waveguides 104 and 106 satisfying the requirement expressed as (a+g)/2L<tan theta1<(a+g)/L, a transmission loss less than 3.55 dB can be achieved regardless of changes in the width g of the gap formed between the waveguides 104 and 106.

In addition, since the angle formed by the axial direction of the output waveguides 104 and 106 and the direction of incidence of the light signal (the direction of the axis of the input waveguide 102) is small, the Y-branch structure 100 in the embodiment can be employed as a slab waveguide.

(C) Other Embodiments

While the Y-branch structure that may be adopted commonly in optical integrated circuit devices are explained in reference to the first and second embodiments above, examples of optical integrated circuit devices that are mounted with at least one such Y-branch structure include a 1×n splitter (which includes a Y-branch waveguide circuit) and an optical transmission/reception module circuit.

In the first and second embodiments, specific requirement are imposed upon the Y-branch structure. However, even when these requirement are not satisfied, a tapered waveguide having an input surface with a waveguide width a equal to the width of the input waveguide, which is connected flush to the input waveguide, and an output surface with a waveguide width W (>2a+g) is larger than the width 2a+g achieved by adding the width g of the gap between the output waveguide to the width 2a equal to the total of the widths of the two output waveguides each having a waveguide width a equal to the width of the input waveguide which is connected with the two output waveguides via a stage achieves superior transmission characteristics compared to the Y-branch structure in the prior art.

As has been explained, in the first aspect of the invention, in the optical integrated circuit device provided with a Y-branch structure through which a light signal input through the input waveguide is branched and transmitted into two output waveguides, the Y-branch structure having an input surface with the waveguide width a equal to the width of the input waveguide which is connected flush to the input waveguide and an output surface having the waveguide width W (>2a+g) is larger than the width 2a+g achieved by adding the gap width g between the output waveguides to the width 2a equal to the total of the widths of the two output waveguides each having the waveguide width a equal to the width of the input waveguide which is connected to the two output waveguides via a stage is less likely to manifest loss at the branching portion from both the characteristics point of view and the structural point of view, compared to the circuit in the prior art.

In addition, in the second aspect of the present invention, by ensuring that the tapered waveguide in the first aspect of the invention satisfies the requirement theta 2<theta 1<2× theta2 with its length L, the opening angle theat1 of its inclined surfaces relative to the central axis of the tapered waveguide and the mounting angle theta2 at which the output waveguides are mounted at the tapered waveguide relative to the central axis of the tapered waveguide achieving the relationships expressed as tan theta2=g/2L and a+2L tan theta 1>2a+g, a Y-branch structure with changes in the gap width between the output waveguides less likely to manifest as a fluctuations in the transmission loss is realized.

In the third aspect of the present invention, by ensuring that the tapered waveguide in the first aspect of the invention satisfies the requirement theta 2<1.0° with its length L, the opening angle theat1 of its inclined surfaces relative to the central axis of the tapered waveguide and the mounting angle theta2 at which the output waveguides are mounted at the tapered waveguide relative to the central axis of the tapered waveguide achieving the relationships expressed as; (a+g)/2L<tan theta1<(a+g)/L, a Y-branch structure with changes in the gap width between the output waveguides less likely to manifest as fluctuations in the transmission loss is realized.

The entire disclosure of Japanese Patent Application No. 11-270454 filed on Sept. 24, 1999 including specification, claims, drawings and summary is incorporated herein by reference in its entirety.

What is claimed is:

1. An optical integrated circuit device having a Y-branch structure through which light signal input through an input waveguide is branched and transmitted into two output waveguides, with said Y-branch structure having;

an input surface with a waveguide width a equal to the width of said input waveguide, which is connected flush to said input waveguide; and an output surface with a waveguide width W (>2a+g) is larger than a width 2a+g achieved by adding a gap g width of the gap between said output waveguides to a width 2a equal to the total of the widths of said two output waveguides each having a waveguide width a equal to the width of said input waveguide, which is connected to said two output waveguides via a stage.

2. An optical integrated circuit device according to claim 1, wherein;

when L represents the length of said tapered waveguide, theta1 represents the opening angle of an inclined surface of said tapered waveguide relative to the central axis of said tapered waveguide and theta2 represents the mounting angle at which said output waveguides are mounted at said tapered waveguide relative to the central axis of said tapered waveguide with L, theta1 and theta2 satisfying the requirement expressed as;

tan theta2=g/2L and a+2L tan theta 1>2a+g, said tapered waveguide meets the requirement theta2<theta1<2×theta 2.

3. An optical integrated circuit device according to claim 1, wherein;

when L represents the length of said tapered waveguide, theta1 represents the opening angle of an inclined surface of said tapered waveguide relative to the central axis of said tapered waveguide and theta2 represents the mounting angle at which said output waveguides are mounted at said tapered waveguide relative to the central axis of said tapered waveguide with L, theta1 and theta2 satisfying requirements expressed as;

(a+g)/2L<tan theta1<(a+g)/L, said tapered waveguide meets the requirement theta2<1.0°.

4. An optical integrated circuit device as claimed in claim 1, wherein said stage is provided to project outward relative to said two output waveguides.

5. An optical integrated circuit device as claimed in claim 2, wherein said stage is provided to project outward relative to said two output waveguides.

6. An optical integrated circuit device as claimed in claim 3, wherein said stage is provided to project outward relative to said two output waveguides.

* * * * *